(12) United States Patent
Li

(10) Patent No.: US 6,813,661 B2
(45) Date of Patent: Nov. 2, 2004

(54) PORTABLE AUDIO SYSTEM

(76) Inventor: Bing Li, 2703 Joelle Dr., Toledo, OH (US) 43606

( * ) Notice: Subject to any disclaimer, the term of this patent is extended or adjusted under 35 U.S.C. 154(b) by 53 days.

(21) Appl. No.: 10/393,172

(22) Filed: Mar. 20, 2003

(65) Prior Publication Data

US 2004/0184359 A1 Sep. 23, 2004

(51) Int. Cl.$^7$ .............................................. G06F 13/00
(52) U.S. Cl. .............................. 710/62; 710/29; 710/65; 710/72
(58) Field of Search ................................ 710/7, 20–22, 710/29–35, 52–57, 62–64, 65–68, 72–74; 369/13 T, 6, 30.18; 361/683–686

(56) References Cited

U.S. PATENT DOCUMENTS

| | | | |
|---|---|---|---|
| 5,040,217 A | 8/1991 | Brandenburg et al. ... | 704/200.1 |
| 5,285,498 A | 2/1994 | Johnston ........................ | 381/2 |
| 5,481,614 A | 1/1996 | Johnston ........................ | 381/2 |
| 5,579,430 A | 11/1996 | Grill et al. ................... | 704/203 |
| 6,292,440 B1 | 9/2001 | Lee ................................. | 369/7 |
| 6,344,808 B1 | 2/2002 | Taruki et al. .................. | 341/65 |
| 6,372,974 B1 | 4/2002 | Gross et al. ................... | 84/609 |
| 6,393,430 B1 | 5/2002 | Van Ryzin ............... | 707/104.1 |
| 6,423,892 B1 | 7/2002 | Ramaswamy ................ | 84/609 |
| 6,446,080 B1 | 9/2002 | Van Ryzin et al. ...... | 707/104.1 |
| 6,487,145 B1 | 11/2002 | Berhan .................... | 369/30.15 |
| 6,490,432 B1 | 12/2002 | Wegener et al. ........... | 455/3.08 |
| 6,631,098 B2 * | 10/2003 | Chang et al. ................... | 369/7 |
| 6,675,233 B1 * | 1/2004 | Du et al. ....................... | 710/14 |
| 6,711,464 B1 * | 3/2004 | Yap et al. .................... | 700/233 |
| 2001/0008996 A1 | 7/2001 | Choi | |
| 2002/0033089 A1 | 3/2002 | Lee et al. | |
| 2002/0083238 A1 | 6/2002 | Naka et al. | |
| 2002/0087225 A1 | 7/2002 | Howard | |
| 2002/0105861 A1 | 8/2002 | Leapman | |
| 2002/0116277 A1 | 8/2002 | Kraft | |
| 2002/0164973 A1 | 11/2002 | Janik et al. | |
| 2002/0171567 A1 | 11/2002 | Altare et al. | |
| 2003/0002395 A1 | 1/2003 | Chang et al. | |
| 2003/0002399 A1 | 1/2003 | Millikan et al. | |
| 2003/0012375 A1 | 1/2003 | Sako et al. | |
| 2003/0016463 A1 | 1/2003 | Nakahara et al. | |
| 2004/0054827 A1 * | 3/2004 | Liu et al. ...................... | 710/74 |

* cited by examiner

Primary Examiner—Christopher B. Shin
(74) Attorney, Agent, or Firm—MacMillan, Sobanski & Todd, LLC

(57) ABSTRACT

A portable audio system includes a compact disc drive and a control unit communicable through a communication interface. The control unit includes a user interface, a processing means, memory, and an audio output. The control unit is detachable from the compact disc drive, and is operable while disconnected from the compact disc drive. The processing means of the control unit is configured to read data from a compact disc within the compact disc drive. The processing means can encode the data into digitally formatted files, and store the files within the memory of the control unit while the control unit is connected to the compact disc drive. The processing means can read, encode, and store the data at a rate equal to or faster than the normal rate of play of the data. The processing means of the control unit can produce an audio signal representative of the data in one of the files stored within the memory regardless of whether the control unit is connected to the compact disc drive.

29 Claims, 4 Drawing Sheets

PORTABLE AUDIO SYSTEM

TECHNICAL FIELD

This invention relates in general to audio systems. More particularly, this invention pertains to a portable audio system having a detachable pocket-size control unit and a compact disc drive.

BACKGROUND OF THE INVENTION

Typical portable audio systems are bulky and may have limiting operational requirements. For example, compact disc players can only be subjected to a limited amount of movement without interruption in play. Additionally, portable audio systems require the music media, such as a compact disc, to be carried along with the player. Therefore, to listen to a variety of music, multiple media may be required. Carrying multiple media with the audio system, especially sensitive media like compact discs, limits the benefit of a portable audio system.

It is known that audio tracks from a media, such as a compact disc, may be converted into a compressed file format and stored for later retrieval and play. Several known digital file compression formats exist, such as WMA (Windows Media Audio), OGG Vorbis™, ATRAC (Adaptive Transform Acoustic Coding), MLP (Meridian Lossless Packing), AC-3 (Audio Compression-3), MP3 (Moving Picture Expert Group 1 Audio Layer-3), and MP3Pro. Portable MP3 players are devices that can store files formatted in MP3 format, and then retrieve and produce an audio signal representative of the MP3 file. Portable MP3 players eliminate the need for carrying all of the desired media with the portable audio system. However, portable MP3 players require a computer or other conversion device to transfer MP3 files to the MP3 player for storage. The computer or other device contains the processing means, hardware, and software necessary for converting the audio tracks into MP3 file format. To operate the computer or other conversion device and the software for converting and storing audio tracks requires knowledge beyond that of many consumers. Although attempts have been made to simplify this conversion software, the consumer perception of the skill level required to operate such a device deters potential buyers for fear of lack of enough knowledge to successfully operate such a device. Additionally, the use of the computer or other device conveys the perception of a complicated and time consuming process to reap the benefits of the MP3 player.

Therefore, it would be advantageous to develop a portable audio system capable of retaining the audio tracks from multiple media without requiring the use of a computer or other complicated device.

SUMMARY OF THE INVENTION

The above objects as well as other objects not specifically enumerated are achieved by a portable audio system of this invention.

The portable audio system includes a compact disc drive and a control unit. Both the compact disc drive and the control unit each include a communication interface communicable with one another. The control unit includes a user interface, a processing means, memory, and an audio output. The control unit is detachable from the compact disc drive, and is operable while disconnected from the compact disc drive. The processing means of the control unit is configured to read data from a compact disc within the compact disc drive. The processing means can encode the data into digitally formatted files, and store the files within the memory of the control unit while the control unit is connected to the compact disc drive. The processing means can read, encode, and store the data at a rate equal to or faster than the normal rate of play of the data. The processing means of the control unit can produce an audio signal representative of the data in one of the files stored within the memory regardless of whether the control unit is connected to the compact disc drive.

According to this invention, there is also provided an alternate portable audio system including a compact disc drive and a control unit. Both the compact disc drive and the control unit each include a communication interface communicable with one another. The control unit includes a user interface, a processing means, memory, and an audio output. The control unit is detachable from the compact disc drive, and is operable while disconnected from the compact disc drive. The processing means of the control unit is configured to read data from a compact disc within the compact disc drive, and determine if the data is previously formatted into storable files. The processing means can store the data previously formatted into storable files within the memory of the control unit. The processing means can encode the data that is not previously formatted into storable files into storable formatted files, and store the files within the memory of the control unit while the control unit is connected to the compact disc drive. The processing means can read, encode, and store the data at a rate equal to or faster than the normal rate of play of the data. The processing means of the control unit can produce an audio signal representative of the data in one of the files stored within the memory regardless of whether the control unit is connected to the compact disc drive.

According to this invention, there is also provided a portable compact disk drive including a compact disc reading unit and a control unit. Both the compact disc reading unit and the control unit each include a communication interface communicable with one another. The control unit includes a user interface, a processing means, memory, and an audio output. The control unit is detachable from the compact disc reading unit, and is operable while disconnected from the compact disc reading unit. The processing means of the control unit is configured to read data from a compact disc within the compact disc reading unit. The processing means can encode the data into digitally formatted files, and store the files within the memory of the control unit while the control unit is connected to the compact disc reading unit. The processing means can read, encode, and store the data at a rate equal to or faster than the normal rate of play of the data. The processing means of the control unit can produce an audio signal representative of the data in one of the files stored within the memory regardless of whether the control unit is connected to the compact disc reading unit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
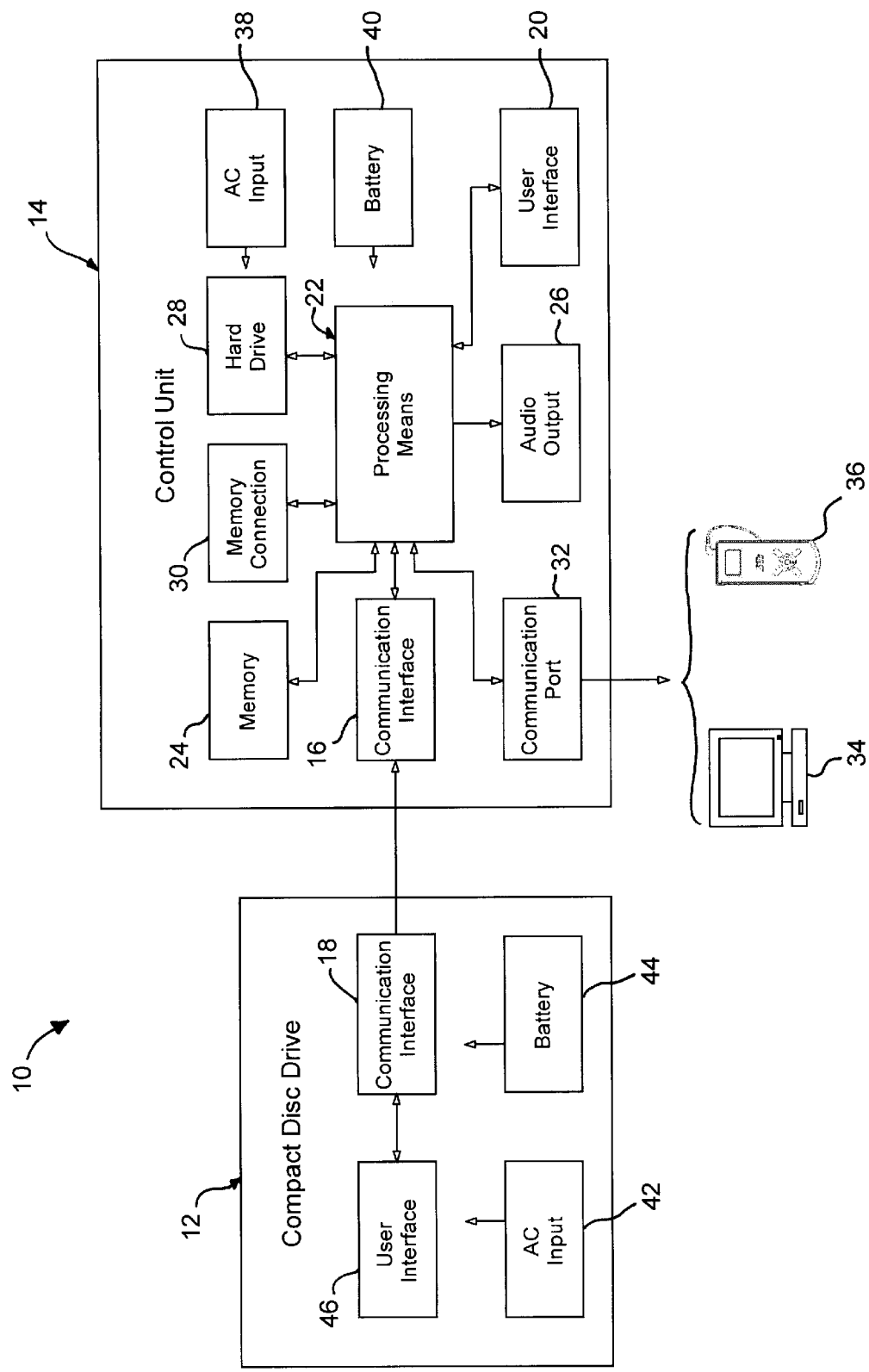
FIG. 1 is a block diagram of a portable audio system in accordance with this invention.

Referring now to the drawings, there is illustrated in FIG. 1 a portable audio system, indicated generally at 10, in accordance with this invention. The portable audio system 10 includes a compact disc drive 12 and a control unit 14. Portable, as used in this specification, refers to an object that is easily capable of being carried by a user. The compact disc drive 12 can be conventional in the art except as described below, and may be capable of reading the data stored on a compact disc, not shown, in several conventional formats, preferably CD-DA (digital audio-ICE 908) and CD-ROM (computer data ISO/ICE 10149) format. In a most preferred embodiment, the compact disc drive 12 is only capable of reading data stored on a compact disc in CD-DA format. The compact disc drive 12 may be any size and shape, and is preferably portable.

The control unit 14 has a communication interface 16 communicable with a communication interface 18 of the compact disc drive. The communication interface 16 and communication interface 18 may be any communicably connectable corresponding interfaces, such as IDE/ATA (integrated drive electronics or AT attachment), SCSI (Small Computer System Interface), PCI (Peripheral Component Interconnect) interfaces, or other multi-pin corresponding interfaces. In a preferred embodiment, the communication interface 16 of the control unit 14 and the communication interface 18 of the compact disc drive 12 are corresponding IDE/ATA (integrated drive electronics or AT attachment) interfaces, and may use any ATA standard specification. However, the communication interface 16 and communication interface 18 may be may be any devices that are communicably connectable to one another to transmit digital data and optionally, power. Further, the communication interface 16 and the communication interface 18 may be connected by a digital wire connection, such as a pair of IDE connectors on either end of an IDE cable, with each of the IDE connectors attached to a respective one of the communication interface 16 and the communication interface 18 or any other suitable ribbon wire and connector combination. However, it will be appreciated that the communication interface 16 and the communication interface 18 may be any communicably connectable in any manner. The communication interface 16 and the communication interface 18 are capable of sending and/or receiving or both sending and receiving digital data that may include data beyond the digital data representative of the compact disc digital audio data. The digital data transferred between the communication interface 16 and the communication interface 18 preferably includes commands to control one of the compact disc drive 12 and the control unit 14. Thus, the communication interface 16 and the communication interface 18 may function to transfer additional data beyond the digital data conventionally transferred through a digital audio input or output. In a preferred embodiment, the compact disc drive 12 is a compact disc reading unit, and does not include a user interface or processing means. In this embodiment, the compact disc drive 12 is controlled by commands received through the communication interface 18 from another device, such as the control unit 14.

The control unit 14 is detachable from the compact disc drive 12. The control unit 14 may be any size and shape. Preferably, the control unit 14 is portable and pocket-sized. A pocket-sized object is an object that is sized so that the sum of a perimeter and height of the object is equal to or less than about 500 millimeters.

The control unit 14 includes a user interface 20, a processing means 22, memory 24, and an audio output 26. The user interface 20 of the control unit 14 is configured to allow a user to input commands to control the operation of at least one of the compact disc drive 14 and the control unit 12. The user interface 20 also communicates information regarding the operation of at least one of the compact disc drive 12 and the control unit 14. The user interface 20 of the control unit 14 may allow a user to operate the compact disc drive 12 while the control unit 14 is attached to the compact disc drive 12. The user interface 20 may include at least one button, track ball, and touch screen device to allow a user to input various commands. The user interface 20 of the control unit 14 may include at least one LCD (liquid crystal display) to indicate such things as the command line and file contents of the control unit. The user interface may include a display that allows a user to select various displayed options using at least one of a button, track ball, and touch screen device.

The processing means 22 of the control unit 14 is configured to read data from a compact disc (not shown) loaded within the compact disc drive 12. The processing means 22 can determine if the data is in an appropriate storable format, such as a digital compression format, including formats such as WMA (Windows Media Audio), OGG Vorbis™, ATRAC (Adaptive Transform Acoustic Coding), MLP (Meridian Lossless Packing), AC-3 (Audio Compression-3), MP3 (Moving Picture Expert Group 1 Audio Layer-3), and MP3Pro. If the processing means 22 determines that the data is in an appropriate storable format, the processing means 22 can store the files within the memory 24 of the control unit 14 while the control unit 14 is connected to the compact disc drive 12. If the processing means 22 determines that the data is in a format that is not an appropriate storable format, the processing means 22 can encode the data into files in a storable format, and can store the files within the memory 24 of the control unit 14 while the control unit 14 is connected to the compact disc drive 12. Again, the storable format files may be any appropriate storable format file, such as a digital compression format described above. In a preferred embodiment, the processing means 22 encodes the data into files in MP3 format. The reading, determination of format, potential encoding, and storing of the data occurs at a rate equal to or faster than the normal rate of play of the compact disc data. In a preferred embodiment, the processing means 22 can read data in CD-DA format and encode the data into a digital compression format with up to a sampling rate of about 384 kbps. However, it will be appreciated that the sampling rate may be any rate including a rate higher than that described for the preferred embodiment.

The processing means 22 is configured to read, encode, and store the data of the compact disc while simultaneously producing an audio signal representative of the data of the compact disc. The processing means 22 can read, encode and store the data at a rate faster than the rate of normal play of the data, or the processing means 22 can read, encode, store, and produce an audio signal representative of the data at the rate of normal play of the data. Alternatively, the processing means 22 could read, encode, and store the data at a rate faster than the rate of normal play of the data, while simultaneously producing an audio signal representative of the data at the rate of normal play of the data. It will be appreciated that the processing means 22 could produce the audio signal from the compact disc data or the stored data using any suitable buffering system to ensure the continuity of the audio signal. The processing means 22 of the control unit 14 may be able to produce an audio signal representative of the data of the compact disc within the compact disc drive 12 while the control unit 14 is connected to the compact disc drive 12, although such is not required. The processing means 22 of the control unit 14 may also produce an audio signal representative of the data in one or more of the files stored within the memory 24, with the signal corresponding to the data of the compact disc within the compact disc drive. The signal is provided to the audio output 26 regardless of whether the control unit 14 is connected to the compact disc drive 12.

In a preferred embodiment, the processing means 22 can encode data from the compact disc in CD-DA format at a rate approximately twelve (12) times faster than the rate of normal play of the data. In a preferred embodiment, the processing means 22 can convert an entire compact disc in CD-DA format in a time of about 4 or 5 minutes.

The memory 24 of the control unit may be any memory device suitable for storing the digital data. The memory 24 may be any memory device, including a magnetic, optical, or removable flash memory device or solid-state floppy disk card, such as CompactFlash Type I or Type II developed by Sandisk®, SD™ (Secure Digital) by Sandisk®, Smart Media developed by Toshiba, Memory Stick® developed by Sony, xD-Picture Card by Fuji, the micro-optical media available from Data Play, or any PCMCIA Type I or Type II memory card or memory stick. In a preferred embodiment, the memory 24 holds between about 200 and about 500 digital compression format representations of songs. In a preferred embodiment, the memory 24 may store up to about 2 gigabytes of data.

The audio output 26 may be any suitable output capable of conveying an analog audio signal produced by the processing means 22, including traditional output jacks for communicable connection with amplification devices such as earphones or other speakers.

The control unit 14 may include a hard drive 28, although such is not required. The hard drive 28 may be any magnetic media device capable of storing data, including a conventional Winchester disk drive, a cartridge drive, or a microdrive, such as is available from Pockey Drives or Iomega®. In a preferred embodiment, the hard drive 28 is an embedded hard drive, such as the 1.8-inch Type II PC Card hard disk drive, Model No. MK5002 MPL or Model No. MK1003GAL from Toshiba.

The processing means of the control unit 14 may be adapted to store the files in a storable format within the hard drive 28, the memory 24, or both.

The control unit 14 may further comprise at least one optional connection 30 for communicably connecting additional memory devices for use by the processing means 22. The connection 30 may be at least one memory slot adapted to communicably connect at least one memory device to the processing means 22. The connection 30 may be adapted to communicably receive at least one memory device, including magnetic, optical, or removable flash memory devices (solid-state floppy disk cards), such as CompactFlash Type I or Type II developed by Sandisk®, SD™ (Secure Digital) by Sandisk®, Smart Media developed by Toshiba, Memory Stick® developed by Sony, xD-Picture Card by Fuji, the micro-optical media available from Data Play, or any PCMCIA Type I or Type II memory card or memory stick. In a preferred embodiment, the connection 30 is one memory slot.

The control unit 14 may further optionally include a communication port 32 capable of transferring data in any digital format. The communication port 32 may be any suitable communication port, such as a USB (Universal Serial Bus) port, a wired network port, Bluetooth, IrDA (Infrared Data Association), Fire Wire (IEEE 1394 High Performance Serial Bus), Wi-Fi (Wireless Fidelity) or HomeRF, or other wireless port compliant with IEEE 802.11A or 802.11B specifications. The control unit 14 may adapted to communicate with an external computer 34 through the communication port 32. The external computer 34 may be any external device, such as a personal computer, an automated teller machine, or a server. Additionally, or alternatively, the control unit 14 may be adapted to communicate with a separate similar control unit 36 through the communication port 32. The control unit 14 may communicate stored data from the memory 24 or the hard drive 28 through the communication port 32. The control unit 14 may also receive data from the communication port 32. In a preferred embodiment, the control unit 14 may send and additionally or alternatively receive commands through the communication port 32 to control the operation of at least one of the compact disk drive 12 and the control unit 14. In a preferred embodiment, the control unit 14 may exchange stored files with the similar control unit 36. In a preferred embodiment, the control unit 14 may send and receive data through the communication port 32 to send the unique table of contents of the compact disc within the compact disc drive 12, and the control unit 14 may receive data related to the compact disc identified by the unique table of contents. The data received may be provided from the CDDB (Compact Disc Database by Gracenote) or any other source. It will be appreciated that this data transfer may be facilitated by the use of the computer 34 or another device connected to the communication port 32. It will be appreciated that the control unit 14 could interface and transfer data directly to an online database, such as CDDB, without the aid of the computer 34 or any other local device.

The control unit 14 may include an AC input 38 to connect the control unit 14 to an AC power source. Additionally, or alternatively, the control unit 14 may include a battery 40. The power supplied through the AC input 38 or the power from the battery 40 may power the components of the control unit 14 in any suitable manner, such as by use of a AC/DC converter (not shown) or a DC/DC converter (not shown), both of which are well known. The control unit 14 may be adapted to supply power to the compact disc drive 12, although such is not required. The compact disc drive 12 may include an AC input 42 for supplying power to the compact disc drive 12. Additionally, or alternatively, the compact disc drive 12 may include a battery 44 for supplying power to the compact disc drive 12. The compact disc drive 12 may be adapted to recharge the battery 40 of the control unit 14 while the control unit 14 is attached to the compact disc drive 12.

The compact disc drive 12 may include a user interface 46, and the compact disc drive 12 may be adapted to be operated by the user interface 46. The user interface 46 may be operable to defer to the commands entered in the user interface 20 while the control unit 14 is attached to the compact disc drive 12.

Figure 2:
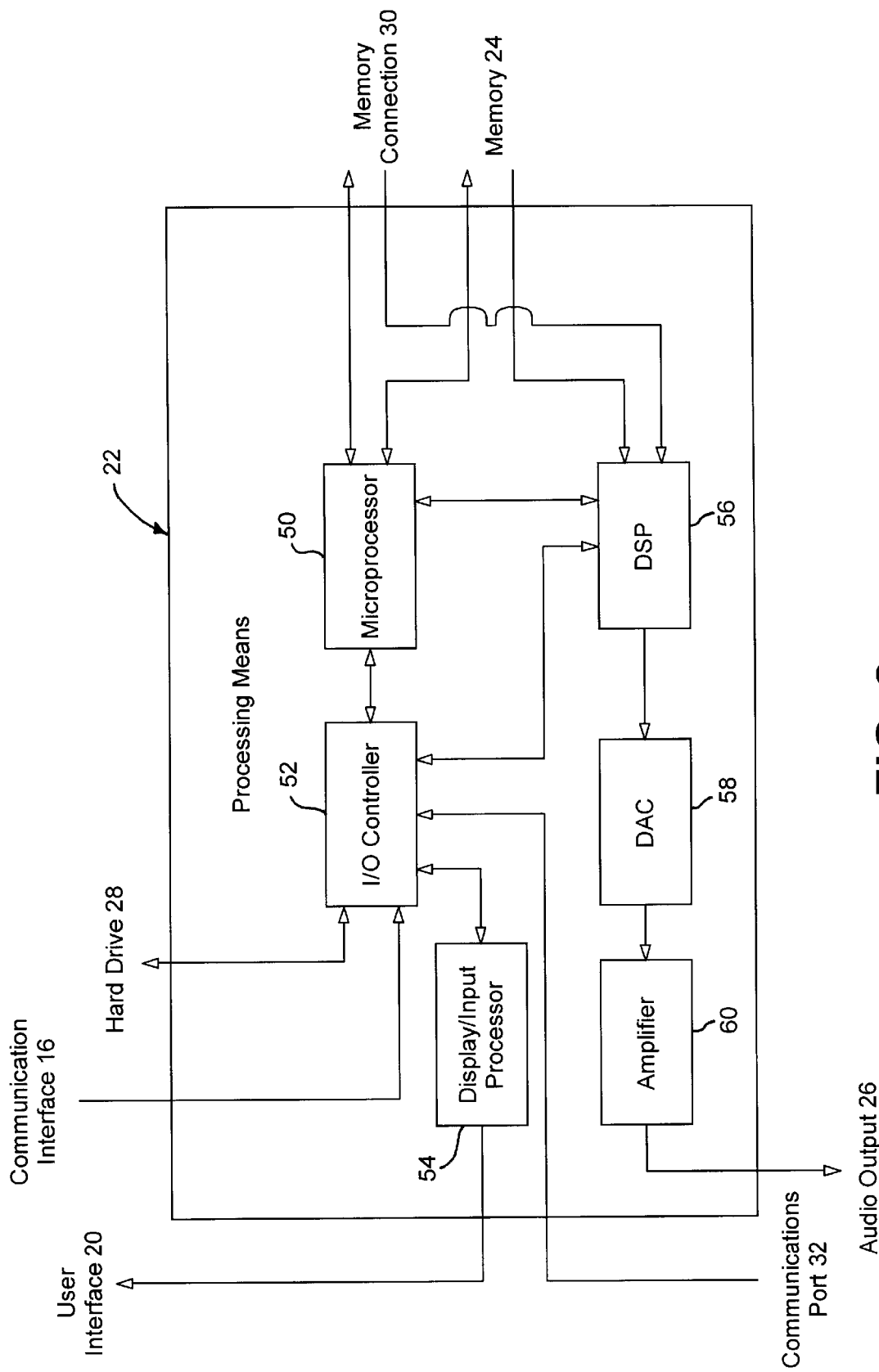
FIG. 2 is a block diagram of a processing means of the portable audio system illustrated in FIG. 1.

Referring now to FIG. 2, there is illustrated the processing means 22 of the portable audio system 10 which is shown in FIG. 1. The processing means 22 includes a microprocessor 50, which may be any suitable microprocessor device. In a preferred embodiment, the microprocessor 50 is a modified system-on-chip, such as one of the Model Nos. EP7312 and EP9312 manufactured by Cirrus Logic®. The microprocessor 50 is communicably connected to the memory 24, and may read and write data to the memory 24. An I/O controller 52 is communicably connected to the microprocessor 50. The input and output of the microprocessor 50 is controlled by the I/O controller 52. The I/O controller is also communicably connected to the communication interface 16, the hard drive 28, the communications port 32, and a display/input processor 54. The display/input processor 54 manages the data transferred to and input received from the user interface 20. It will be appreciated that the I/O controller 52 and the display/input processor 54 may be combined into a single device. A DSP (digital signal processor) 56 may be communicably connected to the microprocessor 50, although such is not required. It will be appreciated that the microprocessor 50 may be capable of performing the operations described herein of the DSP 56 without a separate DSP device. Further, it is contemplated that the microprocessor 50 and the DSP 56 may be integrated into a single device. The DSP 56 is controlled by the microprocessor 50. The DSP 56 can retrieve digitally compressed data from the memory 24, the memory connection 30, and the compact disc drive 12, the hard drive 28, and the communications port 32 via the I/O controller 52. The DSP 52 runs a decompression algorithm on the digitally compressed data. In a preferred embodiment, the DSP 52 may be one of DSP Model Nos. TMS320C6211, TMS320C62111B, TMS320C6411, and TMS320C6711 manufactured by Texas Instruments. The DSP 52 then outputs the decompressed data to a DAC (digital-to-analog converter) 58. The DAC 58 converts the data into an analog signal, and transmits the analog signal to an amplifier 60. The amplifier 60 boosts the strength of the signal and transmits the analog signal to the audio output 26.

Figure 4:
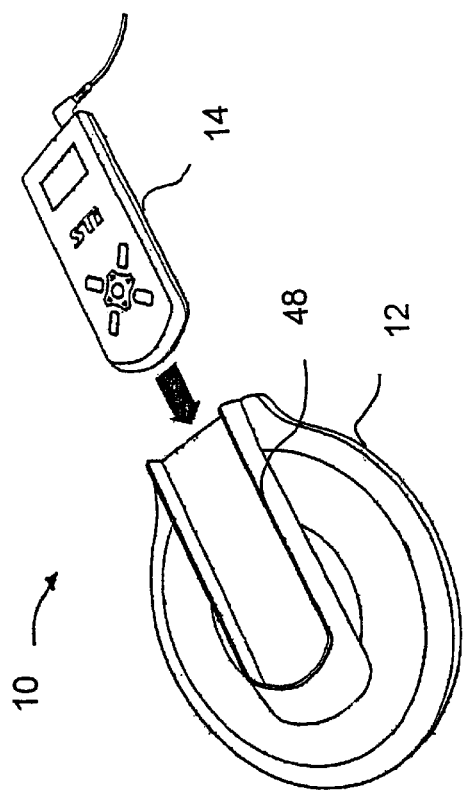
FIG. 4 is a perspective view of the portable audio system illustrated in FIGS. 1 and 3.
Figure 3:
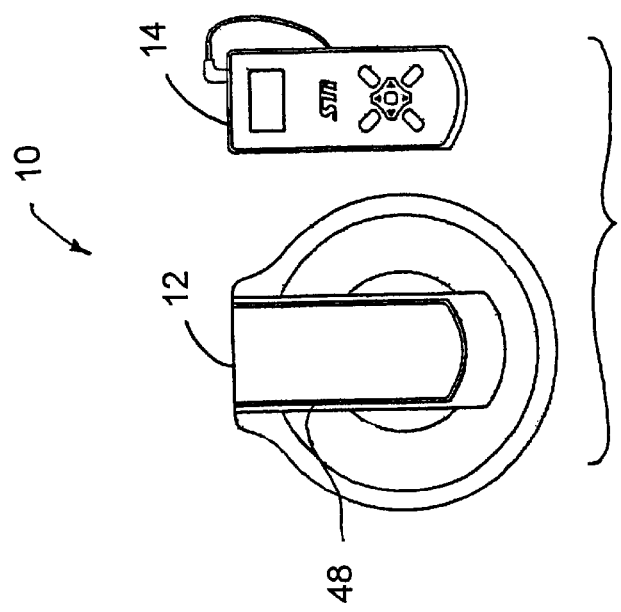
FIG. 3 is a schematic top view of the portable audio system illustrated in FIG. 1.

FIG. 3 illustrates the portable audio system 10 with the control unit 14 detached from the compact disc drive 12. The portable audio system 10 with the control unit 14 aligned for attachment to the compact disc drive 12 is shown in FIG. 4. As shown, the compact disc drive 12 includes a slot 48, which is sized to receive the control unit 14. It will be appreciated that the slot 48 may include a locking mechanism (not shown) to lock the control unit 14 to the compact disc drive 12. The communication interface 18 of the compact disc drive 12 may be located within the slot 48, or the communication interface 18 may be located on any portion of the compact disc drive 12. The communication interface 16 of the control unit 14 may be located on the control unit 14 such that when the control unit 14 is positioned within the slot 48, the communication interface 16 communicably connects to the communication interface 18. However, it will be appreciated that the communication interface 16 and the communication interface 18 may be located on any portion of the respective control unit 14 and compact disc drive 12, and may be communicably connected in any suitable manner. The slot 48 may be shaped to engage the control unit 14 such that the control unit 14 may only be removed from and inserted into the slot 48 in a direction parallel to a surface of the compact disc drive 12, as is shown in FIG. 4. This engagement may facilitate the placement of the communication interface 18 within the slot 48. For example, if the communication interface 18 is an IDE interface, such an engagement would bring the communication interface 16 and communication interface 18 into communicable connection with one another. This arrangement would make the connection of the compact disc drive 12 and the control unit 14 easier for the user because alignment of the control unit 14 with the slot 48 would necessarily align the interfaces. In this arrangement, the communication interface 18 would be partially shielded by the slot 48 from the surrounding environment.

Figure 5:
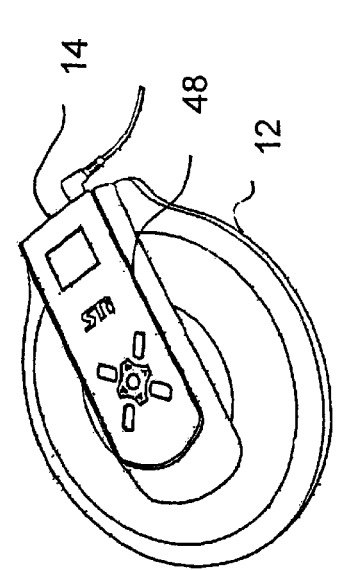
FIG. 5 is a perspective view of the portable audio system illustrated in FIGS. 1, 3, and 4, with the control unit attached to the compact disc drive.

The portable audio system 10 is shown in FIG. 5 with the control unit 14 attached to the compact disc drive 12. As shown, the control unit 14 is within the slot 48. However, it will be appreciated that the slot 48 is not required, and the control unit 14 may attached to the compact disc drive 12 in any suitable manner, including by the mere communicable connection between the communication interface 18 and the communication interface 16.

Figure 6:
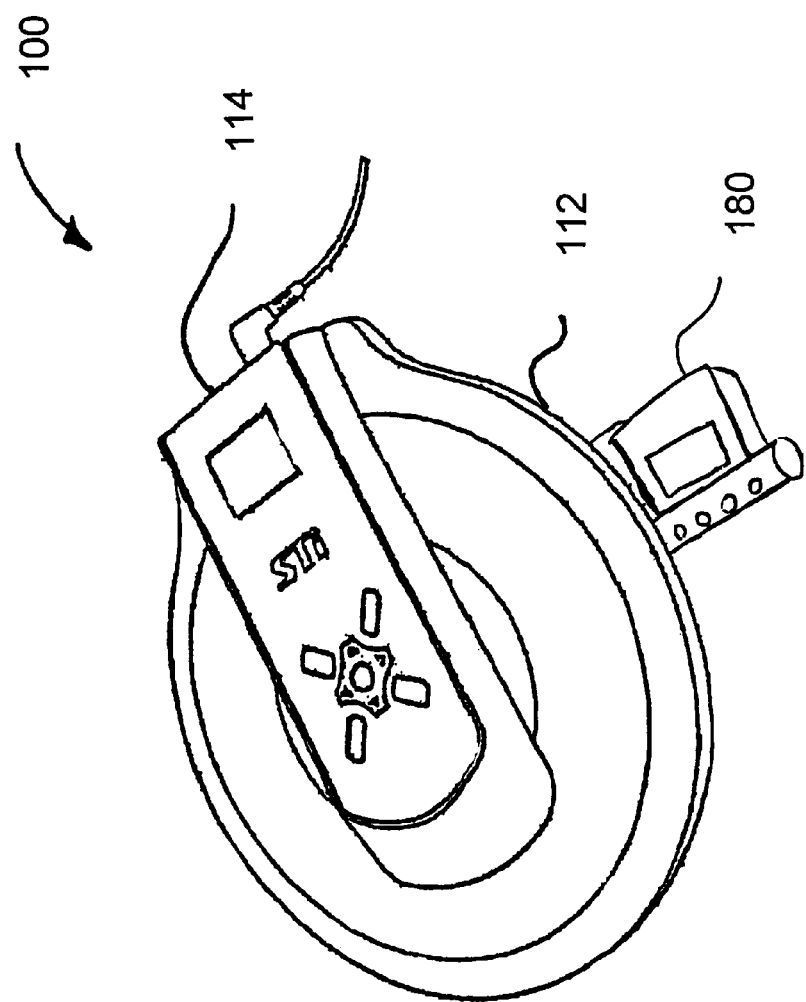
FIG. 6 is a perspective view of a portable audio system in accordance with an alternate embodiment of this invention.

Referring now to FIG. 6, a portable audio system, indicated generally at 100, is illustrated in accordance with an alternate embodiment of the invention. The portable audio system 100 is similar to the portable audio system 10, and only the differences therebetween will be described. The portable audio system 100 includes a compact disc drive 112 having a remote control attachment 180 and a control unit 114. At least a portion of the remote control attachment 180 is removable from the compact disc drive 112 and may operate the compact disc drive 112 while detached from the compact disc drive 112. The remote control attachment 180 may be any device suitable to facilitate remote communicable connection of the remote control attachment 180 to the compact disc drive 112, such as an infrared, optical or other wireless device. It is contemplated that the remote control attachment 180 could additionally or alternatively control the control unit 114. It is alternatively contemplated that the control unit 114 could override commands received from the remote control attachment 180 while the control unit 114 is attached to the compact disc drive 112.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A portable audio system comprising:
   a portable compact disc drive having a communication interface; and
   a control unit having a communication interface communicable to the communication interface of the compact disc drive, a user interface, a processing means, memory, and an audio output, the control unit being detachable from the compact disc drive;
   wherein the processing means of the control unit is configured to read data from a compact disc within the compact disc drive, encode the data into digitally formatted files, and store the files within the memory of the control unit while the control unit is connected to the compact disc drive, with the reading, encoding, and storing of the data occurring at a rate equal to or faster than a normal rate of play of the data; and
   wherein the processing means of the control unit is configured to send an audio signal representative of the data in the stored files to the audio output regardless of whether the control unit is connected to the compact disc drive.

2. The portable audio system according to claim 1 wherein the control unit is pocket-sized.

3. The portable audio system according to claim 1 wherein the processing means is configured to read, encode, and store the data of the compact disc while simultaneously producing an audio signal representative of the data of the compact disc.

4. The portable audio system according to claim 1 wherein the control unit further comprises a hard drive.

5. The portable audio system according to claim 4 wherein the control unit is adapted to store the files within at least one of the hard drive and the memory.

6. The portable audio system according to claim 1 wherein the control unit further comprises a connection for communicably connecting additional memory devices for use by the processing means.

7. The portable audio system according to claim 1 wherein the control unit further comprises at least one memory slot adapted to communicably connect at least one memory card to the processing means.

8. The portable audio system according to claim 1 wherein the control unit further comprises a communication port, and further wherein the control unit is configured to transfer data in a digital format through the communication port.

9. The portable audio system according to claim 8 wherein the control unit is adapted to communicate with an external computer through the communication port.

10. The portable audio system according to claim 9 wherein the external computer is a similar control unit.

11. The portable audio system according to claim 1 wherein the control unit is adapted to supply power to the compact disc drive.

12. The portable audio system according to claim 1 wherein the control unit includes a power source, and the compact disc drive is adapted to recharge the power source of the control unit while the control unit is attached to the compact disc drive.

13. The portable audio system according to claim 1 wherein the compact disc drive includes a source of power.

14. The portable audio system according to claim 1 wherein the user interface of the control unit is configured to control the operation of at least one of the compact disc drive and the control unit.

15. The portable audio system according to claim 1 wherein the compact disc drive includes a user interface, wherein the compact disc drive is adapted to be operated by the user interface.

16. The portable audio system according to claim 15 wherein the user interface of the control unit is configured to control the operation of the compact disc drive when the control unit is attached to the compact disc drive.

17. The portable audio system according to claim 1 wherein the communication interface of the compact disc drive and the communication interface of the control unit are communicably connected to one another by a digital wire.

18. The portable audio system according to claim 1 wherein the portable audio system includes a remote control attachment.

19. The portable audio system according to claim 1 wherein the compact disc drive is capable of reading and outputting the data stored on the compact disc within the compact disc drive wherein the data is in compact disc digital audio format.

20. A portable audio system comprising:
a compact disc drive having a communication interface; and
a control unit having a communication interface communicable to the communication interface of the compact disc drive, a user interface, a processing means, memory, and an audio output, the control unit being detachable from the compact disc drive;
wherein the processing means of the control unit is configured to:
read data from a compact disc within the compact disc drive, and determine if the data is previously formatted into storable files;
store data previously formatted into storable files within the memory of the control unit;
encode into storable formatted files data that is not previously formatted into storable files, and store the encoded data within the memory of the control unit;
wherein the processing means is configured to perform the read, store and encode functions while the control unit is connected to the compact disc drive;
wherein the processing means is configured to perform the read, store and encode functions at a rate equal to or faster than a normal rate of play of the data; and
wherein the processing means of the control unit is configured to send an audio signal representative of the data in the files stored within the memory to the audio output regardless of whether the control unit is connected to the compact disc drive.

21. The portable audio system according to claim 20 wherein the control unit is pocket-sized.

22. The portable audio system according to claim 20 wherein the processing means is configured to read, encode, and store the data of the compact disc while simultaneously producing an audio signal representative of the data of the compact disc.

23. The portable audio system according to claim 20 wherein the control unit further comprises a communication port, and further wherein the control unit is configured to transfer data in a digital format through the communication port.

24. The portable audio system according to claim 20 wherein the compact disc drive is capable of reading and outputting the data stored on the compact disc within the compact disc drive wherein the data is in compact disc digital audio format.

25. A portable compact disc drive comprising:
a compact disc reading unit having a communication interface; and
a control unit having a communication interface communicable to the communication interface of the compact disc reading unit, a user interface, a processing means, memory, and an audio output, the control unit being detachable from the compact disc reading unit;
wherein the processing means of the control unit is configured to read data from a compact disc within the compact disc reading unit, encode the data into digitally formatted files, and store the files within the memory of the control unit while the control unit is connected to the compact disc reading unit, with the reading, encoding, and storing of the data occurring at a rate equal to or faster than a normal rate of play of the data; and
wherein the processing means of the control unit is configured to send an audio signal representative of the data in the stored files to the audio output regardless of whether the control unit is connected to the compact disc reading unit.

26. The portable audio system according to claim 25 wherein the control unit is pocket sized.

27. The portable audio system according to claim 25 wherein the processing means is configured to read, encode, and store the data of the compact disc while simultaneously producing an audio signal representative of the data of the compact disc.

28. The portable audio system according to claim 25 wherein the control unit further comprises a hard drive.

29. The portable audio system according to claim 28 wherein the control unit is adapted to store the files within at least one of the hard drive and the memory.

* * * * *